C. E. MENTZER.
AUTOMOBILE STEERING WHEEL LOCK.
APPLICATION FILED MAY 26, 1917.

1,266,842.  Patented May 21, 1918.

Witness
G. F. Tuschek

Inventor
Claude E. Mentzer
By Owen & Bair
Attys

UNITED STATES PATENT OFFICE.

CLAUDE E. MENTZER, OF DES MOINES, IOWA.

AUTOMOBILE-STEERING-WHEEL LOCK.

1,266,842.  Specification of Letters Patent.  Patented May 21, 1918.

Application filed May 28, 1917. Serial No. 171,315.

*To all whom it may concern:*

Be it known that I, CLAUDE E. MENTZER, a citizen of the United States, and resident of Des Moines, in the county of Polk and State of Iowa, have invented a certain new and useful Automobile-Steering-Wheel Lock, of which the following is a specification.

The object of my invention is to provide an automobile steering wheel lock of simple, durable and inexpensive construction.

More particularly it is my object to provide a device whereby the steering wheel of an automobile may be readily locked near the steering post column or shell, said locking mechanism including means whereby a key may be given a full turn or a half turn for operating the mechanism for permitting the key to be withdrawn after the locking mechanism has been operated.

With these and other objects in view, my invention consists in the construction, arrangement and combination of the various parts of the device, whereby the objects contemplated are attained, as hereinafter more fully set forth, pointed out in my claim and illustrated in the accompanying drawings, in which:

Figure 1:
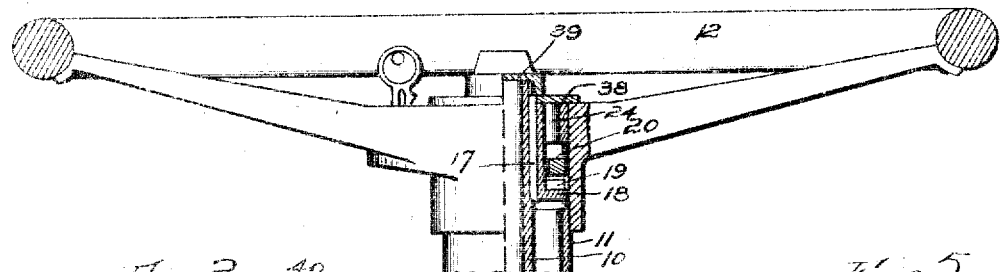
Figure 1 shows a side elevation of an automobile steering wheel equipped with a lock embodying my invention part of the hub of the wheel and the lock mechanism being shown in vertical, cross section.

In the accompanying drawings, I have used the reference numeral 10 to indicate generally the central, hollow steering shaft of an automobile which is received in the hollow sleeve of the post 11.

The steering wheel 12 is provided with the hollow hub 13 having a hollow cylindrical downward extension 14, which receives the upper end of the sleeve 11.

Mounted on the shaft 10 is a sleeve 16 held in position by a key 17, and having in its lower end a laterally extending annular flange 18, provided with a series of upwardly extending teeth 19.

Vertically slidable above the flange 18 is an annular ring 20, having on its lower surface a series of teeth 21 adapted in one position of the ring 20 to coact with the teeth 19 on the flange 18.

Secured to the ring 20 on opposite sides thereof are upwardly extending slide bars 22, arranged to slide vertically in grooves 23 on the interior of the hollow hub 13 and the downward extension 14 thereof.

Rotatably mounted in the upper interior of the hub 13 is an annular band 24 to which the upper ends of the bars 22 are secured by screws 25 or the like.

The band 22 is provided on opposite sides with slots 26 which are inclined from their upper ends downwardly and laterally, and are provided at their lower and upper ends with horizontal extensions 27.

Screws 25 extend through the slots 26 and afford means whereby when the band 24 is rotated, the locking bars 22 will be slid vertically.

The hub 13 is provided with a lateral extension 29 forming a housing for a lock 30, having a rotating key cylinder or plug 31. The lock 30 may be of any suitable type such, for instance, as the pin tumbler type. The key cylinder 31 has a key hole slot 32, and is provided at its lower end with a laterally extending lug 33.

Figure 2:
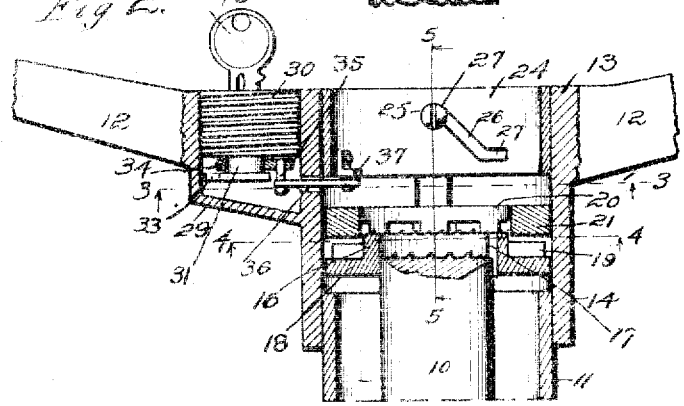
Fig. 2 shows a vertical, central, sectional view through the hub of the wheel and the locking mechanism, the steering shaft and part of the mechanism being broken away, to more clearly show the parts.
Figure 5:
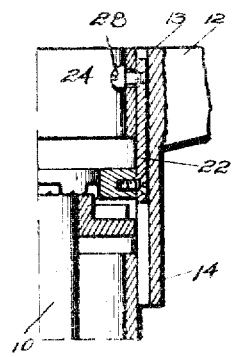
Fig. 5 shows a vertical, sectional view taken on the line 5—5 of Fig. 2.
Figure 3:
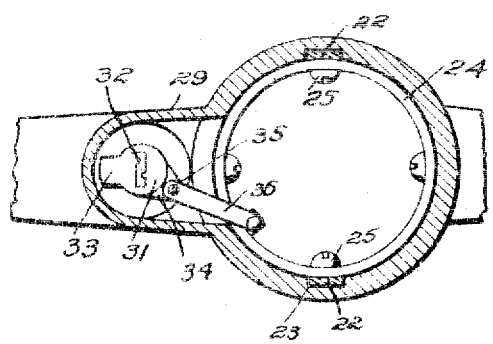
Fig. 3 shows an inverted, horizontal, sectional view taken on the line 3—3 of Fig. 2.
Figure 4:
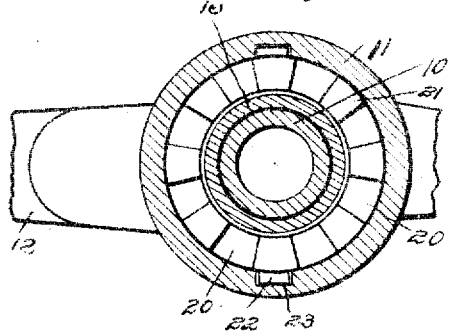
Fig. 4 shows an inverted, horizontal, sectional view taken on the line 4—4 of Fig. 2.

Rotatably or loosely mounted on the key cylinder 31 above the lug 33 is a plate or the like 34 in which is mounted a pin 35 which extends downwardly. Pivoted to the lower end of the pin 35 is a link 36 extending through a horizontally, elongated slot in the wall of the hub 13, as shown in Figs. 2 and 3.

The inner end of the link 36 is pivoted to a bracket 37 on the lower portion of the band 24.

On the upper end of the hub 13 is placed a cover plate 38 which is held in position by a cap 39 screwed on to the upper end of the shaft 10.

The parts hereinbefore described, are so arranged that when the ring 20 is in its lowered position, the teeth 21 engage the teeth 19 and the steering column or sleeve 11, is firmly locked to the hub of the steering wheel by the following means, namely, the pin 17, the ring 16, the teeth 19 on the flange 18, the teeth 21, the ring 20 the members 22 and the extension 14 and hub 13.

Assume that the band 24 is in its raised position, as shown in Fig. 2, and that it is desired to lower the ring 20, causing its teeth to engage the teeth 19, then the key 40 is inserted into the key hole 32 and turned for causing the lug 33 to engage the pin 35 for thereby moving the link 36 and rotating the band 24.

The rotation of the band 24 causes it to travel on the screws 25 and slide them downwardly carrying with it the locking bars 22 and the ring 20 connected therewith, until the teeth 21 engage the teeth 19. The rotation of the band is comparatively slight, but on account of the arrangement of the lug 33 and the pin 35, it will be seen that a full turn may be given to the key on each locking or unlocking operation of the device, so as to permit the key to be readily and easily withdrawn after each operation.

Some changes may be made in the construction, and arrangement of the parts of my improved locking device without departing from the essential spirit and purpose of my invention, and it is my intention to cover by the claim to be issued upon the patent hereof, any such changes which may be reasonably included within the scope of my claim.

I claim as my invention:

In a device of the class described, the combination of two members, one of said members being capable of movement with relation to the other, a lock element on one of said members, a coacting lock element slidably mounted on the other of said members, a tumbler lock mounted adjacent to said last described locking element including a key cylinder or plug, a laterally extending arm on said plug, a rotary member, means for operatively connecting said rotary member and said second described lock member whereby rotation of the rotary member imparts movement to the said second locking member, a collar mounted on said plug, a pin extending away from said collar, a link pivoted on said pin, said link being operatively connected with said rotary member, said pin being arranged in the path of said arm.

Des Moines, Iowa, April 28, 1917.

CLAUDE E. MENTZER.